(12) United States Patent
Wang et al.

(10) Patent No.: US 11,726,183 B2
(45) Date of Patent: *Aug. 15, 2023

(54) MICROMACHINED MIRROR ASSEMBLY WITH PIEZOELECTRIC ACTUATOR

(71) Applicant: BEIJING VOYAGER TECHNOLOGY CO., LTD., Beijing (CN)

(72) Inventors: Youmin Wang, Mountain View, CA (US); Yufeng Wang, Mountain View, CA (US); Qin Zhou, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 684 days.

This patent is subject to a terminal disclaimer.

(21) Appl. No.: 16/658,026

(22) Filed: Oct. 19, 2019

(65) Prior Publication Data

US 2021/0116548 A1   Apr. 22, 2021

(51) Int. Cl.
*G01S 7/481* (2006.01)
*G01S 17/10* (2020.01)
*G02B 26/08* (2006.01)
*G02B 26/10* (2006.01)

(52) U.S. Cl.
CPC ............ *G01S 7/4817* (2013.01); *G01S 17/10* (2013.01); *G02B 26/0858* (2013.01); *G02B 26/105* (2013.01)

(58) Field of Classification Search
CPC ... G01S 7/4817; G01S 17/10; G02B 26/0858; G02B 26/105
See application file for complete search history.

(56) References Cited

U.S. PATENT DOCUMENTS

| 9,843,779 | B2 * | 12/2017 | Giusti | B81B 3/0045 |
| 2001/0051014 | A1 * | 12/2001 | Behin | H02N 1/008 |
| | | | | 385/16 |
| 2010/0195180 | A1 * | 8/2010 | Akanuma | G02B 26/0858 |
| | | | | 359/200.8 |
| 2010/0309536 | A1 * | 12/2010 | Akanuma | G02B 26/0858 |
| | | | | 359/200.8 |
| 2012/0236379 | A1 * | 9/2012 | da Silva | G02B 26/0841 |
| | | | | 359/200.8 |
| 2018/0129036 | A1 * | 5/2018 | Haran | G01R 31/2829 |
| 2019/0064508 | A1 * | 2/2019 | Torkkeli | G02B 26/0841 |

(Continued)

FOREIGN PATENT DOCUMENTS

JP   2009015300 A   *   1/2009   ......... G02B 26/0858

*Primary Examiner* — Michael Lee
(74) *Attorney, Agent, or Firm* — Bayes PLLC (57) ABSTRACT

Embodiments of the disclosure provide a micromachined mirror assembly for controlling optical directions in an optical sensing system. The micromachined mirror assembly includes a micro mirror and at least one piezoelectric actuator. The micro mirror is suspended over a substrate by at least one beam mechanically coupled to the micro mirror, and the at least one piezoelectric actuator is mechanically coupled to the at least one beam and is configured to drive the micro mirror via the at least one beam. The at least one piezoelectric actuator is configured to drive the micro mirror to tilt along a first axis based on a first electrical signal received by the at least one piezoelectric actuator.

17 Claims, 8 Drawing Sheets

(56) References Cited

U.S. PATENT DOCUMENTS

| | | | |
|---|---|---|---|
| 2019/0196178 A1* | 6/2019 | Yamada | G02B 26/0858 |
| 2020/0271920 A1* | 8/2020 | Hirata | G02B 26/08 |
| 2020/0301130 A1* | 9/2020 | Boni | G02B 26/101 |
| 2020/0386985 A1* | 12/2020 | Liukku | G01S 7/4817 |
| 2021/0199775 A1* | 7/2021 | Wang | G02B 26/0858 |
| 2022/0026537 A1* | 1/2022 | Wang | G01S 17/931 |

* cited by examiner

MICROMACHINED MIRROR ASSEMBLY WITH PIEZOELECTRIC ACTUATOR

TECHNICAL FIELD

The present disclosure relates to optical sensing systems such as a light detection and ranging (LiDAR) system, and more particularly to, a micromachined mirror assembly for controlling optical directions in such an optical sensing system.

BACKGROUND

Optical sensing systems such as LiDAR systems have been widely used in autonomous driving and producing high-definition maps. For example, a typical LiDAR system measures the distance to a target by illuminating the target with pulsed laser light beams and measuring the reflected pulses with a sensor such as a photodetector or a photodetector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

The pulsed laser light beams emitted by a LiDAR system are typically directed to multiple directions to cover a field of view (FOV). Various methods can be used to control the directions of the pulsed laser light beams. Existing LiDAR systems generally use electric- or magnetic-based driving methods to steer an optical component in the LiDAR systems to direct the pulsed laser light beams to the surrounding environment. However, both electrostatic- or magnetic-based driving methods have drawbacks. Electrostatic-based methods often suffer weak driving forces, limiting the size of the FOV. Magnetic-based methods may provide larger driving forces but require complex assembling processes. In addition, the cost of adopting the magnetic-based methods is usually high.

Embodiments of the disclosure improve the performance or reduce of cost of optical sensing systems such as LiDAR systems by providing a micromachined mirror assembly driven by piezoelectric actuator(s).

SUMMARY

Embodiments of the disclosure provide a micromachined mirror assembly for controlling optical directions in an optical sensing system. The micromachined mirror assembly includes a micro mirror and at least one piezoelectric actuator. The micro mirror is suspended over a substrate by at least one beam mechanically coupled to the micro mirror. The at least one piezoelectric actuator is mechanically coupled to the at least one beam and is configured to drive the micro mirror via the at least one beam. The at least one piezoelectric actuator is configured to drive the micro mirror to tilt along a first axis based on a first electrical signal received by the at least one piezoelectric actuator.

Embodiments of the disclosure also provide a method for controlling optical directions in an optical sensing system. The method includes providing a micromachined mirror assembly. The micromachined mirror assembly includes a micro mirror and at least one piezoelectric actuator. The micro mirror is suspended over a substrate by at least one beam mechanically coupled to the micro mirror. The at least one piezoelectric actuator is mechanically coupled to the at least one beam. The method also includes receiving, by the at least one piezoelectric actuator, a first electrical signal. The method further includes driving, using the at least one piezoelectric actuator, the micro mirror to tilt along a first axis based on the first electrical signal.

Embodiments of the disclosure further provide an optical sensing system. The optical sensing system includes a transmitter, a receiver, and a mirror assembly. The transmitter is configured to emit optical signals in a plurality of directions. The receiver is configured to detect reflected optical signals. The mirror assembly is configured to control the directions of the optical signals. The mirror assembly includes a micro mirror and at least one piezoelectric actuator. The micro mirror is suspended over a substrate by at least one beam mechanically coupled to the micro mirror. The at least one piezoelectric actuator is mechanically coupled to the at least one beam and is configured to drive the micro mirror via the at least one beam. The at least one piezoelectric actuator is configured to drive the micro mirror to tilt along a first axis based on a first electrical signal received by the at least one piezoelectric actuator.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for controlling optical directions in an optical sensing system (e.g., a LiDAR system) using a mirror assembly having a mirror driven by one or more piezoelectric actuators. For example, the mirror can be driven by the piezoelectric actuator(s) to tilt certain angles along an axis, thereby directing (e.g., guiding, reflecting, inflecting, and/or diffracting) incident laser beams from a laser source towards certain directions to, for example, scan an FOV. The mirror can be a single micro mirror, or an array of micro mirrors integrated into a micromachined mirror assembly made from semiconductor materials using microelectromechanical system (MEMS) technologies. Conventionally, MEMS-based micro mirrors are actuated by electrostatic or magnetic actuators. As discussed above, magnetic actuators, while providing relatively large actuation force, are complicated to assemble. In addition, the cost of constructing a magnetic actuator is high. Electrostatic actuators, on the other hand, provide relatively weak driving force. This problem of insufficient driving force may become more severe when a large aperture mirror with large size is needed. In addition, to control the tilting angle of the mirror, a close control loop is normally needed, which requires accurate measurement of the position of mirror. The measurement of the position is often implemented by an electromagnetic signal-based position sensor, and the sensing signal of such a device may be interfered by the driving signals generated by an electric or magnetic actuator. A piezoelectric actuator can decouple the driving and sensing signals, providing superior performance than the electrostatic and magnetic counterparts. Moreover, the driving force generated by a piezoelectric actuator can be sufficiently large to drive large-size mirrors.

Embodiments of the present disclosure improve the performance and lower the cost of an optical sensing system, which can be used in many applications. For example, the improved optical sensing system can be used in autonomous driving or high-definition map survey, in which the optical sensing system can be equipped on a vehicle.

Figure 1:
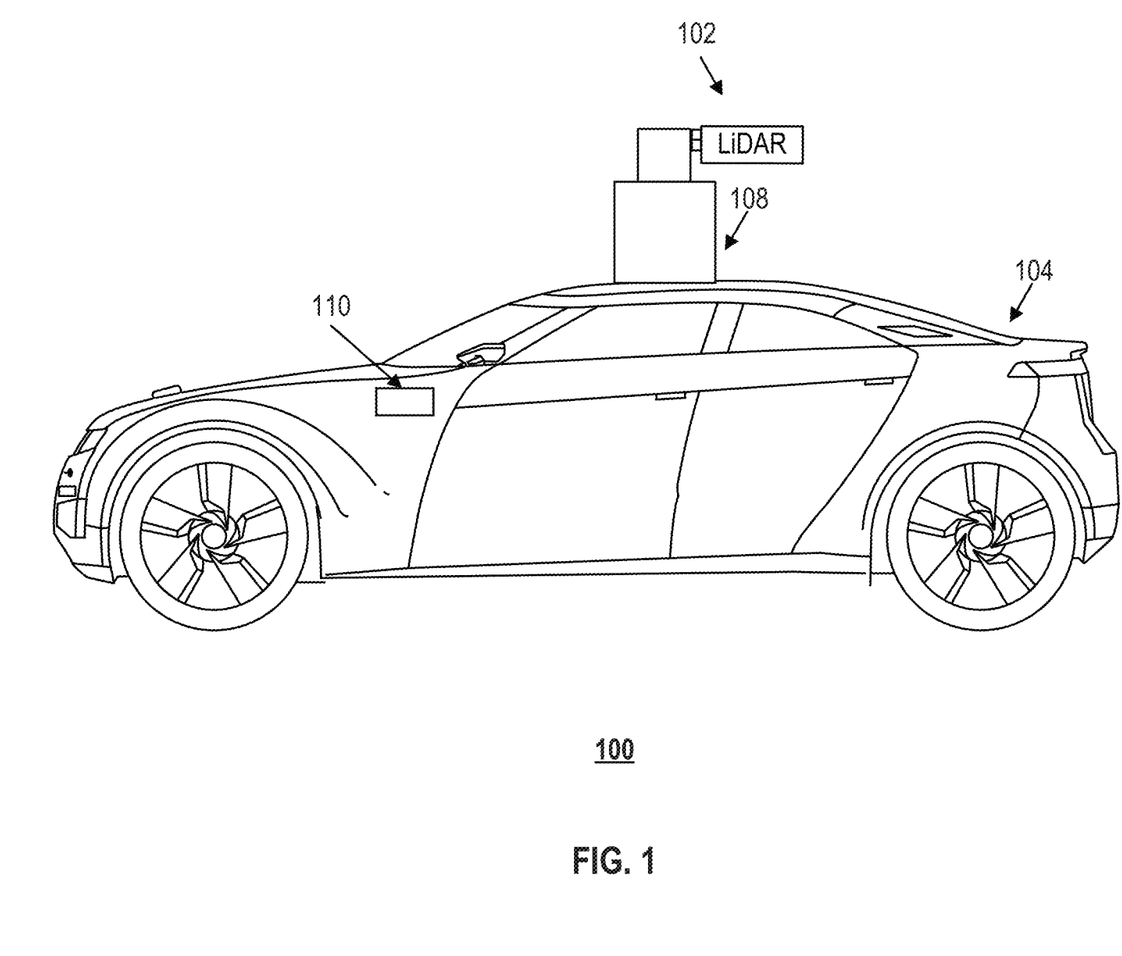
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electromechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with pulsed laser beam and measuring the reflected pulses with a receiver. The laser beam used for LiDAR system 102 may be ultraviolet, visible, or near infrared. In some embodiments of the present disclosure, LiDAR system 102 may capture point clouds including depth information of the objects in the surrounding environment. As vehicle 100 moves along the trajectory, LiDAR system 102 may continuously capture data. Each set of scene data captured at a certain time range is known as a data frame.

Figure 2:
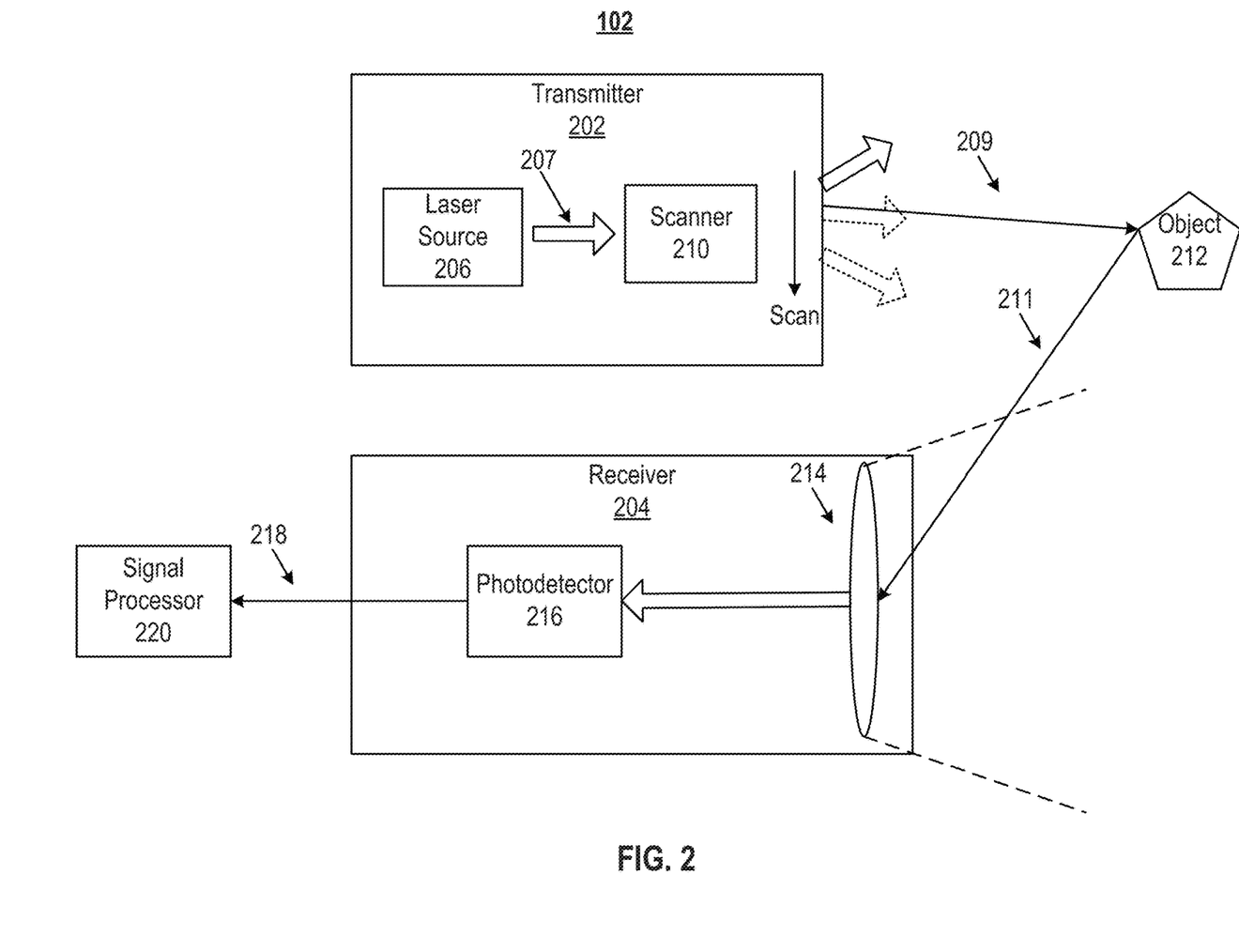
FIG. 2 illustrates a block diagram of an exemplary LiDAR system, according to embodiments of the disclosure.

FIG. 2 illustrates a block diagram of an exemplary LiDAR system 102, according to embodiments of the disclosure. LiDAR system 102 may include a transmitter 202 and a receiver 204. Transmitter 202 may emit laser beams along multiple directions. Transmitter 202 may include one or more laser sources 206 and a scanner 210. As will be described below in greater detail, scanner 210 may include a micromachined mirror assembly having a micro mirror driven by piezoelectric actuator(s).

Transmitter 202 can sequentially emit a stream of pulsed laser beams in different directions within a scan range (e.g., a range in angular degrees), as illustrated in FIG. 2. Laser source 206 may be configured to provide a laser beam 207 (also referred to as "native laser beam") to scanner 210. In some embodiments of the present disclosure, laser source 206 may generate a pulsed laser beam in the ultraviolet, visible, or near infrared wavelength range.

In some embodiments of the present disclosure, laser source 206 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 207 provided by a PLD may be smaller than 1,100 nm, such as 405 nm, between 445 nm and 465 nm, between 510 nm and 525 nm, 532 nm, 635 nm, between 650 nm and 660 nm 670 nm 760 nm, 785 nm, 808 nm, or 848 nm. It is understood that any suitable laser source may be used as laser source 206 for emitting laser beam 207.

Scanner 210 may be configured to emit a laser beam 209 to an object 212 in a first direction. Object 212 may be made of a wide range of materials including, for example, non-metallic objects, rocks, rain, chemical compounds, aerosols, clouds and even single molecules. The wavelength of laser beam 209 may vary based on the composition object 212. In some embodiments, at each time point during the scan, scanner 210 may emit laser beam 209 to object 212 in a direction within a range of scanning angles by rotating the micromachined mirror assembly. In some embodiments of the present disclosure, scanner 210 may also include optical components lenses, mirrors) that can focus pulsed laser light into a arrow laser beam to increase the scan resolution and the range to scan object 212.

In some embodiments, receiver 204 may be configured to detect a returned laser beam 211 returned from object 212. The returned laser beam 211 may be in a different direction from beam 209. Receiver 204 can collect laser beams returned from object 212 and output electrical signals reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include a lens 214 and a photodetector 216. Lens 214 may be configured to collect light from a respective direction in its field of view (FOV). At each time point during the scan, returned laser beam 211 may be collected by lens 214. Returned laser beam 211 may be returned from object 212 and have the same wavelength as laser beam 209.

Photodetector 216 may be configured to detect returned laser beam 211 returned from object 212. In some embodiments, photodetector 216 may convert the laser light (e.g., returned laser beam 211) collected by lens 214 into an electrical signal 218 (e.g., a current or a voltage signal). Electrical signal 218 may be generated when photons are absorbed in a photodiode included in photodetector 216. In some embodiments of the present disclosure, photodetector 216 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiPM/MPCC detector array, or the like.

While scanner 210 is described as part of transmitter 202, it is understood that in some embodiments, scanner 210 can be part of receiver 204, e.g., before photodetector 216 in the light path. The inclusion of scanner 210 in receiver can ensure that photodetector 216 only captures light, e.g., returned laser beam 211 from desired directions, thereby avoiding interferences from other light sources, such as the sun and/or other LiDAR systems. By increasing the aperture of mirror assembly in scanner 210 in receiver 204, the sensitivity of photodetector 216 can be increased as well.

Figure 3A:
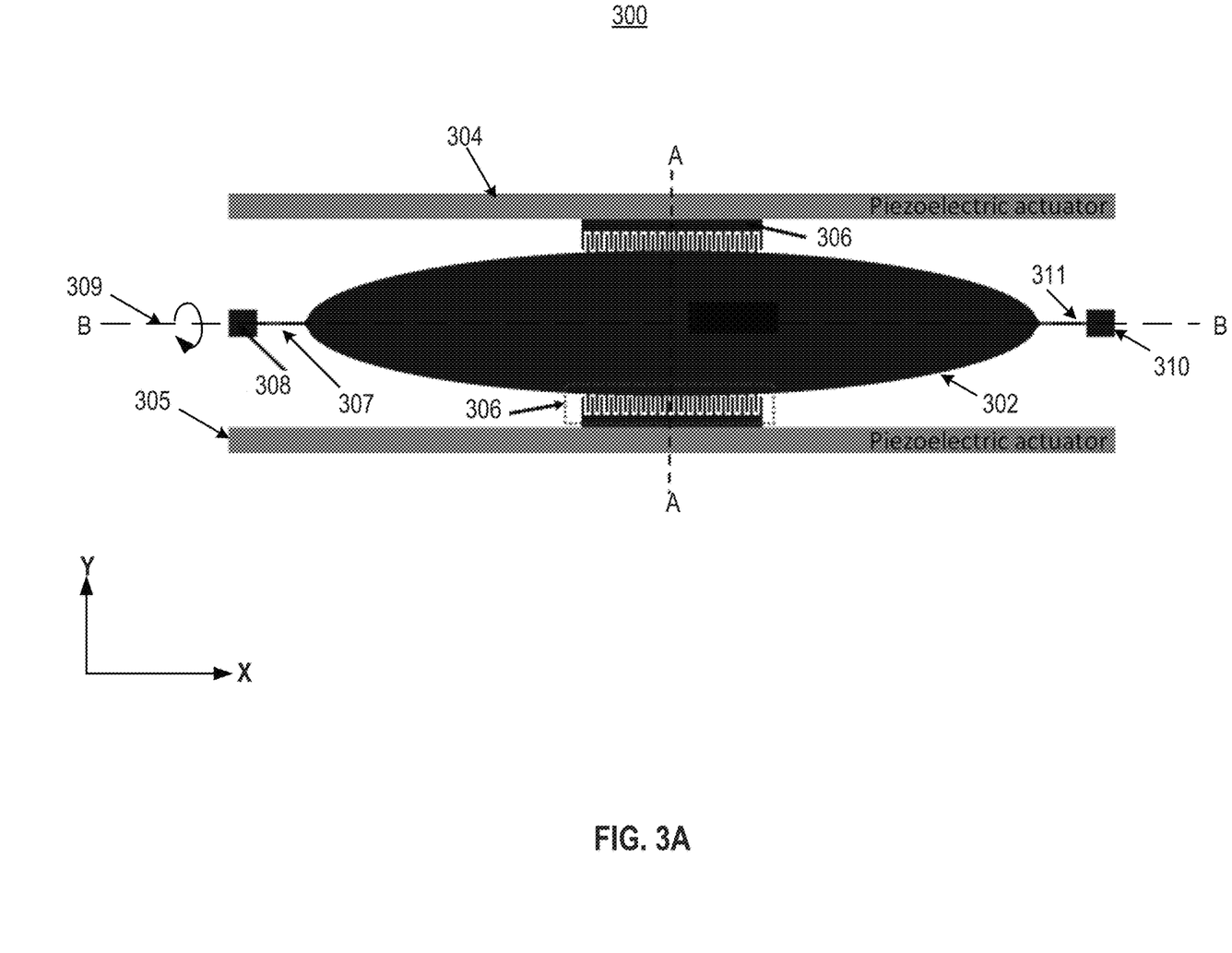
FIG. 3A illustrates a schematic diagram of an exemplary micromachined mirror assembly, according to embodiments of the disclosure.
Figure 3B:
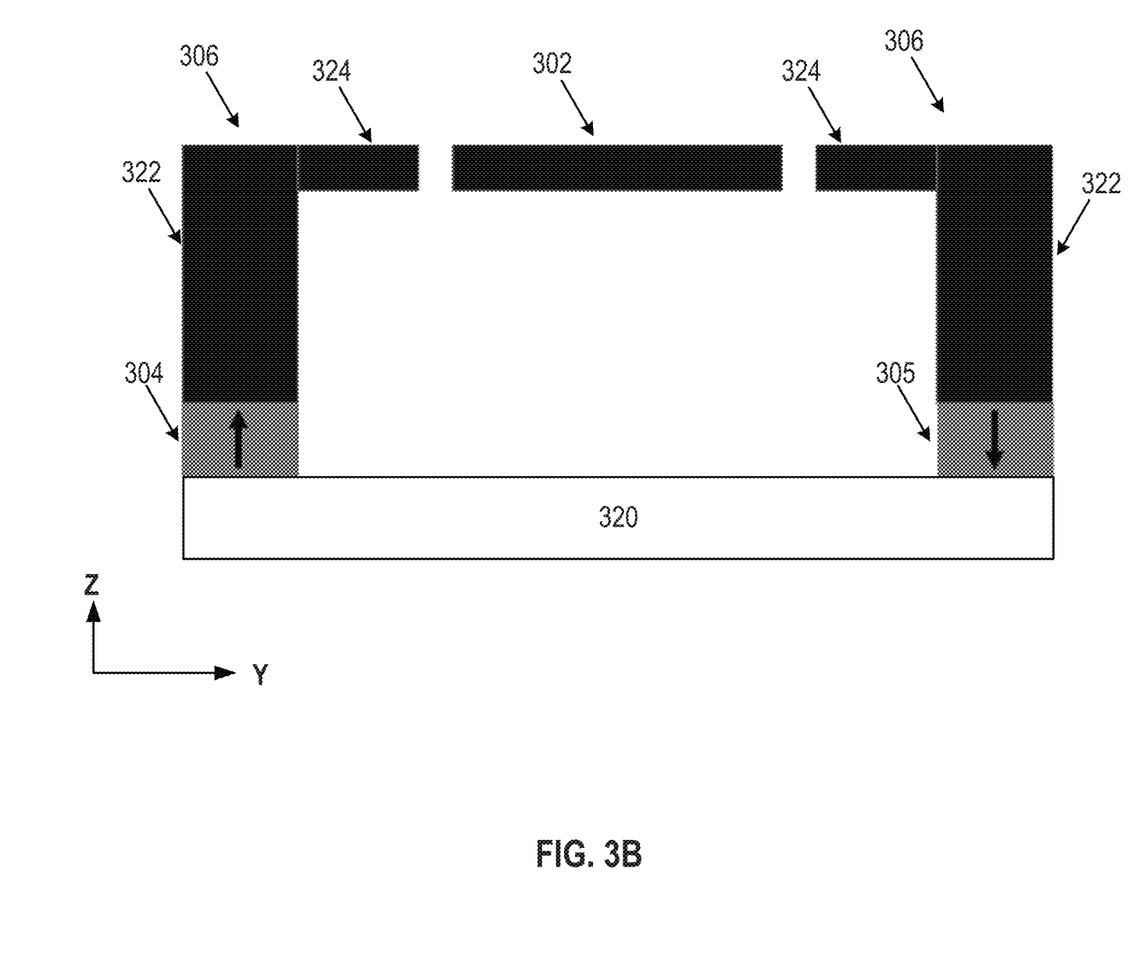
FIG. 3B illustrates a section view along line A-A of the exemplary micromachined mirror assembly in FIG. 3A, according to embodiments of the disclosure.
Figure 3C:
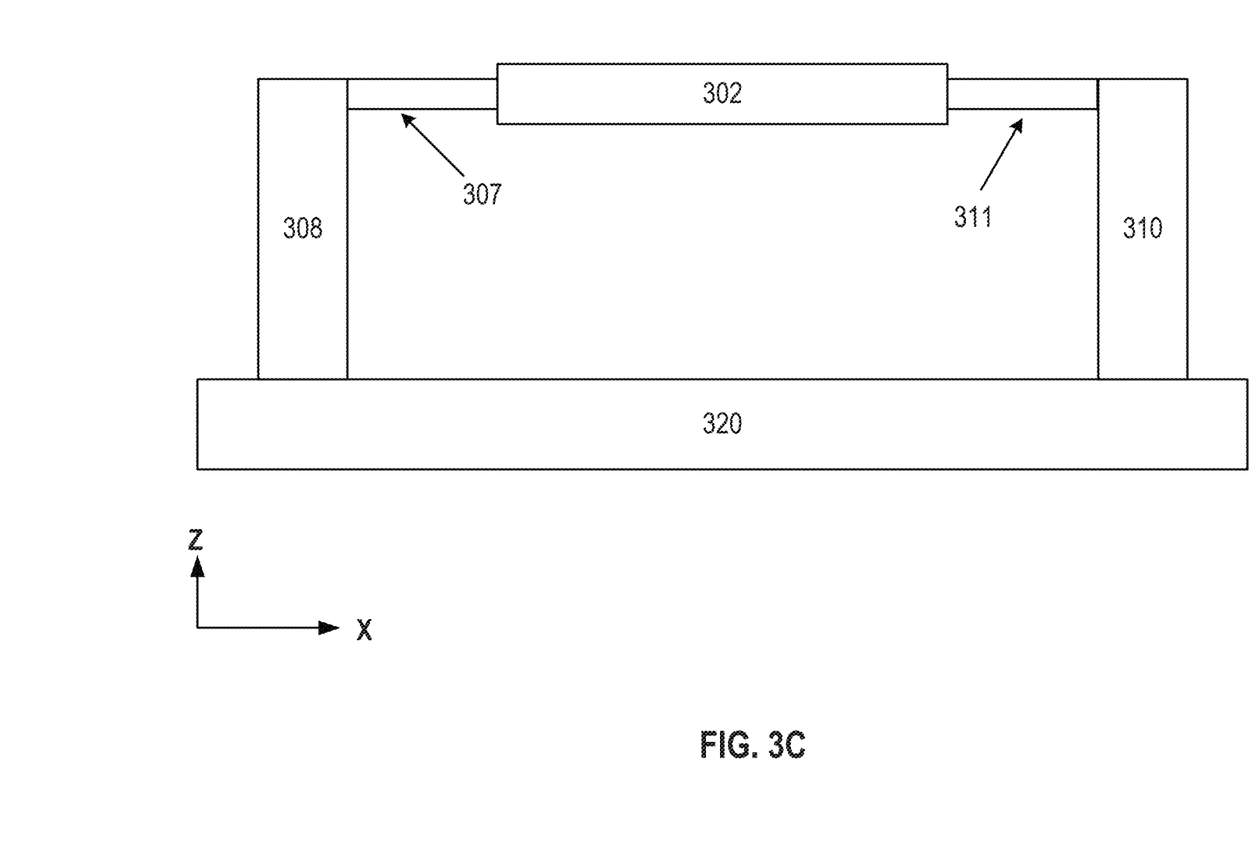
FIG. 3C illustrates a section view along line B-B of the exemplary micromachined mirror assembly in FIG. 3A, according to embodiments of the disclosure.

In some embodiments, the incident angle of laser beam 207 may be fixed relative to scanner 210, and the scanning of laser beam 209 may be achieved by rotating (e.g., tilting) a micro mirror or an array of micro mirrors assembled in scanner 210. FIG. 3A illustrates a schematic diagram of an exemplary micromachined mirror assembly 300, according to embodiments of the disclosure. FIG. 3B illustrates a section view along line A-A of micromachined mirror assembly 300 shown in FIG. 3A, according to embodiments of the disclosure. FIG. 3C illustrates a section view along line B-B of micromachined mirror assembly 300 shown in FIG. 3A, according to embodiments of the disclosure. Different from electrostatic micro-mirror that has weak driving force, the micromachined mirror assembly 300 shown in FIG. 3A uses one or more piezoelectric actuators to drive the micro mirror and operate the micro mirror at resonant mode. Since the piezoelectric actuator(s) can provide much larger force than the electrostatic force, micro mirrors with large aperture can still be driven.

As illustrated in FIGS. 3A-3C, micromachined mirror assembly 300 may include a micro mirror 302 and a pair of piezoelectric actuators 304 and 305. In some embodiments, micromachined mirror assembly 300 may include only one piezoelectric actuator or more than two piezoelectric actuators. A first beam 307 is mechanically coupled to one side of the micro mirror 302, and a second beam 311 is mechanically coupled to the opposite side of the micro mirror 302. Micro mirror 302 may be suspended over a substrate 320 (FIGS. 3B and 3C) by beams 307 and 311 to allow limited movement. For example, micro mirror 302 may be configured to tilt along a rotation axis 309 (also referred to as axis 309). Axis 309 may be defined by beams 307 and 311, as micro mirror 302 may tilt due to the rotation of beams 307 and 311. In some embodiments, micro mirror 302 may be covered by a reflective layer disposed on its top surface (e.g., facing incident laser beam(s)). The reflective layer may form a reflective surface to reflect an incident laser beam, thereby forming a reflected laser beam. By tilting micro mirror 302 to a different angle, the incident laser beam may be reflected to a different direction, forming another reflected laser beam. It is to be understood that although micro mirror 302 is in an eclipse shape as shown in FIG. 3A, the shape of micro mirror 302 is not limited to an eclipse shape, and may vary in other examples, such as a square, round, or rectangular shape.

Micromachined mirror assembly 300 may further include first and second anchors 308 and 310, each mechanically coupled to a respective end of beam 307 and 311 that is farther away from micro mirror 302 and along axis 309. The other end of beams 307 and 311 is mechanically coupled to micro mirror 302. In some embodiments, each one of beams 307 and 311 is configured to rotate around axis 309, thereby driving micro mirror 302 to tilt along axis 309. In some embodiments, anchors 308 and/or 310 may be rigidly coupled to piezoelectric actuator 304 or 305 such that motion or displacement generated by piezoelectric actuator 304/305 can be transferred to anchor 308/310. For example, anchor 308/310 and piezoelectric actuator 304/305 may be both disposed on substrate 320 using MEMS microfabrication techniques.

In some embodiments, when piezoelectric actuator 304 receives a first electrical signal, the first electrical signal may cause piezoelectric actuator 304 to vibrate, for example, through expanding and shrinking in size along one or more dimensions. The vibrating motion and resulting displacement of piezoelectric actuator 304 (e.g., in a direction perpendicular to the paper surface of FIG. 3A and moving up and down in FIG. 3B) is transferred to anchors 308 and 310, causing displacement of anchors 308 and 310 (e.g., tilting up and down when observing from the top as shown in FIG. 3A). The displacement of anchors 308 and 310 further causes beams 307 and 311 to rotate (e.g., twist) around axis 309. Similarly, when piezoelectric actuator 305 receives a second electric signal, the resulting vibration can also be transferred to the rotation motion of beams 307 and 311. The rotation motions of beams 307 and 311 caused by piezoelectric actuators 304 and 305 can be superimposed, either enhancing or reducing each other. For example, when the first and second electric signals have the same frequency and opposite phases (e.g., having a 180-degree phase difference), the expanding of piezoelectric actuator 304 may correspond to the shrinking of piezoelectric actuator 305, thereby enhancing the tilting of anchors 308 and 310. Setting a phase difference other than 180 degrees may also achieve the tilting enhancement effect, but to a lesser degree. In an extreme case, when the first and second electric signals are in phase (zero phase difference), anchors 308 and 310 may not tilt at all because the twisting motions resulting from the vibrations of piezoelectric actuators 304 and 305 completely cancel each other. As beams 307 and 311 rotate/twist around axis 309, micro mirror 302 would be driven to tilt correspondingly. In this way, when piezoelectric actuators 304 and 305 receive electrical signals, they would cause micro mirror 302 to tilt around axis 309.

In some embodiments, micromachined mirror assembly 300 may also include one or more position sensor 306 configured to detect the position of micro mirror 302. As shown in FIGS. 3A and 3B, each position sensor 306 may include a stator 322 attached to a respective piezoelectric actuator (e.g., 304 or 305). Position sensor 304 may include a comb structure 324 comprising a plurality of teeth. The teeth may be interleaved with a corresponding plurality of teeth on micro mirror 302, as shown in FIG. 3A. When piezoelectric actuators 304 and 305 receive electrical signals to drive micro mirror 302 (e.g., tilting micro mirror 302), there would be relative movement between stator 322 and micro mirror 302, causing the overlapping portion between the interleaved teeth of position sensor 306 and micro mirror 302 to change. This change can generate a signal for position sensor 306 to detect the position of micro mirror 302. It is to be understood that the structure of position sensor 306 shown in FIGS. 3A and 3B is exemplary only, and other types of position sensor may be used to detect the position of micro mirror 302.

Because micro mirror 302 is driven by the mechanical motion of piezoelectric actuator(s) instead of electrical force found in conventional mirror assemblies, position sensor 306 would not suffer electrical interference caused by electrical actuator(s). As a result, the sensitivity and accuracy of position sensing can be improved.

Figure 4:
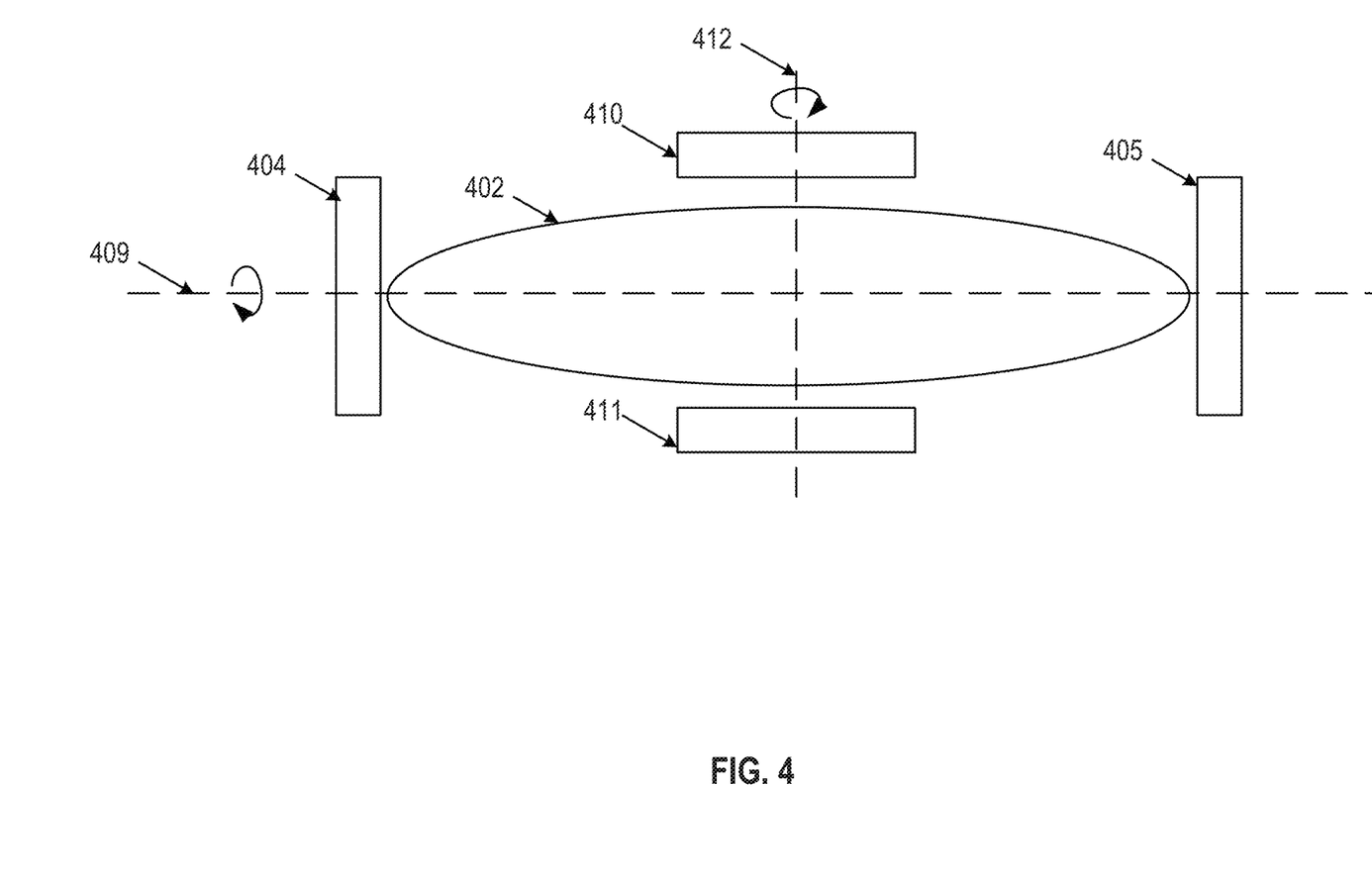
FIG. 4 illustrates a schematic diagram of another exemplary micromachined mirror assembly, according to embodiments of the disclosure.

In order to enable micro mirror 302 to tilt in multiple directions, multiple sets of piezoelectric actuators can be used. As shown in FIG. 4, a first set of piezoelectric actuators comprises piezoelectric actuators 410 and 411. When piezoelectric actuators 410 and 411 receive electric signals, they cause a micro mirror 402 to tilt around a first axis 409. A second set of piezoelectric actuators comprises piezoelectric actuators 404 and 405. When piezoelectric actuators 404 and 405 receive electric signals, they cause micro mirror 402 to tilt around a second axis 412. In some embodiments, axis 409 may be perpendicular to axis 412. In some embodiment, one set of actuators may be disposed on a first substrate to drive micro mirror 402 to tilt along one axis, while the first substrate may be driven by a different set of actuators to tilt along another axis, thereby achieving tilting of micro mirror 402 along multiple axes.

Figure 5A:
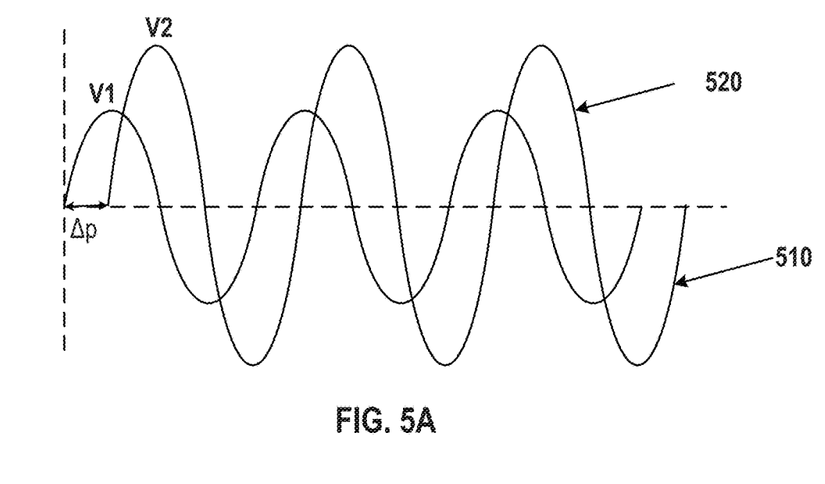
FIG. 5A illustrates waveforms of exemplary voltage signals applied to the actuators of a micromachined mirror assembly, according to embodiments of the disclosure.
Figure 5B:
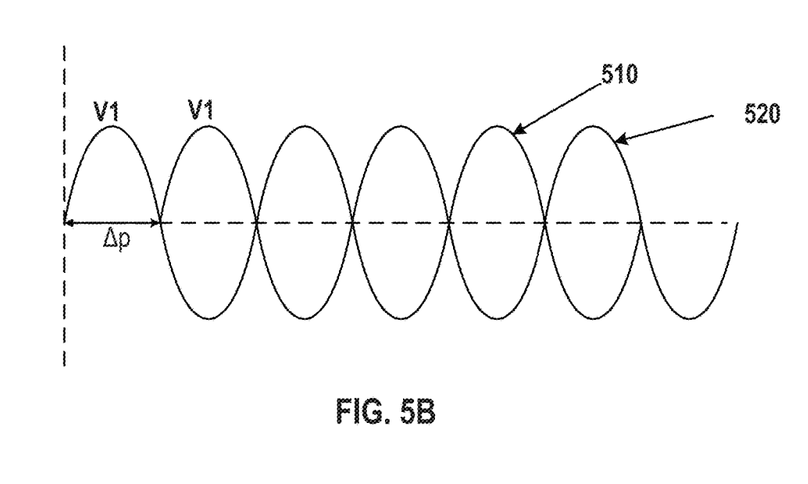
FIG. 5B illustrates waveforms of another set of exemplary voltage signals applied to the actuators of a micromachined mirror assembly, according to embodiments of the disclosure.

The electrical signals used for driving the piezoelectric actuators (e.g., 304 and 305) may take many forms and may have various relationship between each other or among one another. For example, FIG. 5A shows exemplary waveforms of a first electrical signal 510 and a second electrical signal 520. As shown in FIG. 5A, both electrical signals 510 and 520 are sinusoidal AC signals. Signal 510 has an amplitude V1 and signal 520 has an amplitude V2. As shown in FIG. 5A, V2 is greater than V1. In addition, signals 510 and 520 have a 90-degree ($\Delta p=\pi/2$) phase offset. The difference in signal amplitude and/or phase may cause piezoelectric actuators 304 and 305 to vibrate in a particular manner. In some embodiments, the amplitude and/or the phase may be varied (e.g., through a controller) to alter the vibration manner of the piezoelectric actuators, thereby controlling the tilting motion of micro mirror 302. For example, FIG. 5B shows an example where signals 510 and 520 have a 180 degree ($\Delta p=\pi$) phase offset and the same amplitude V1. This signal configuration can generate a balanced vibrating motion with the maximal force, thereby causing micro mirror 302 to tilt equally to both sides with the maximal degree. It is understood that other signal configurations may be used to control the motion of micro mirror 302. The control of voltage signals (e.g., 510, 520) may be achieved by a controller operatively coupled to actuators 304 and 305. In addition, the frequency of voltage signals 510 and 520 may be set to a frequency that is the same as the resonant frequency of micro mirror 302, so as to achieve the maximal driving efficiency.

Figure 6:
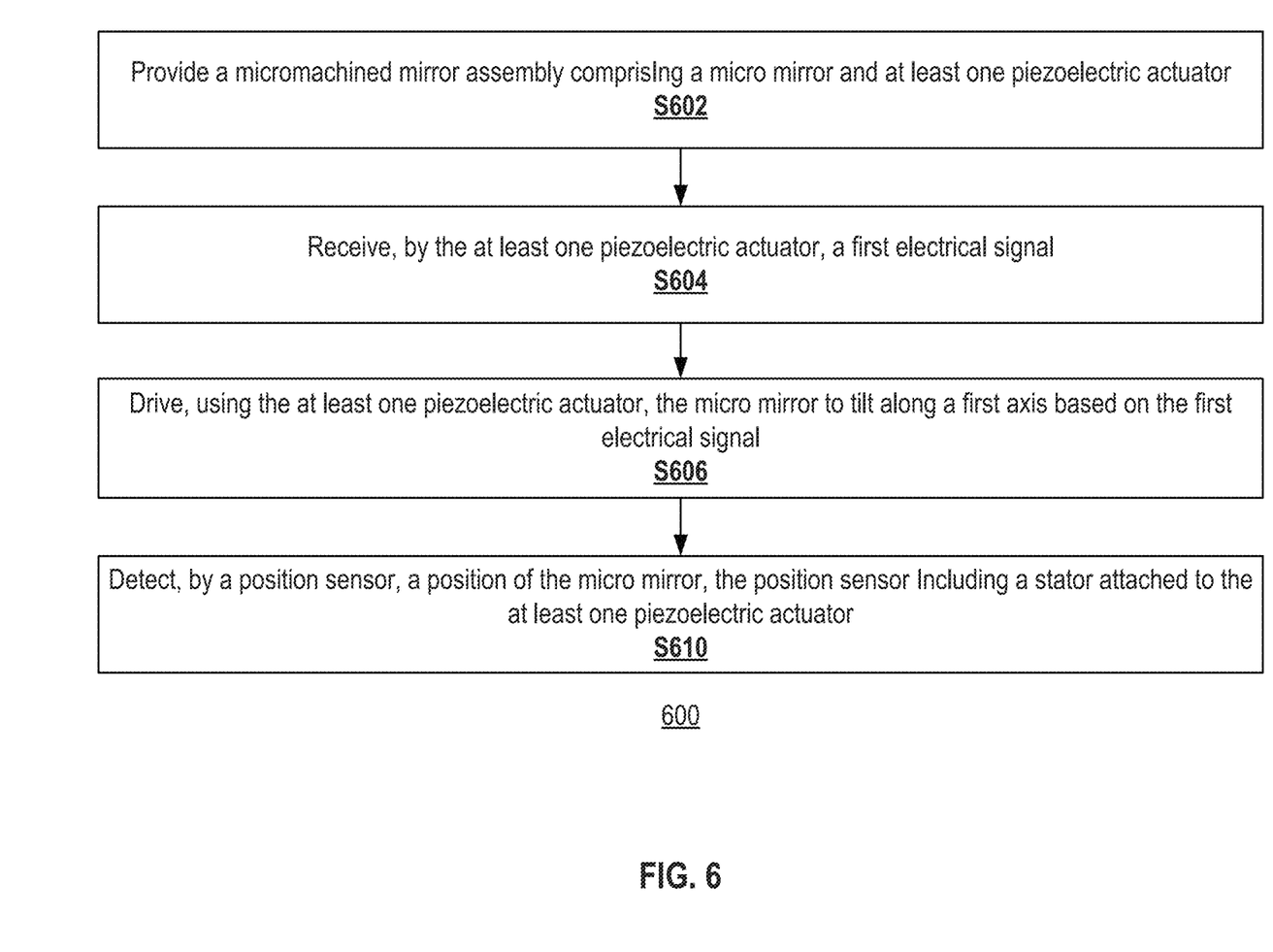
FIG. 6 illustrates a flow chart of an exemplary method for controlling optical directions in an optical sensing system, according to embodiments of the disclosure.

FIG. 6 illustrates a flow chart of an exemplary method 600 for controlling optical directions in an optical sensing system, according to embodiments of the disclosure. It is to be appreciated that some of the steps may be optional. Further, some of the steps may be performed simultaneously, or in a different order than shown in FIG. 6.

In step S602, a micromachined mirror assembly (e.g., micromachined mirror assembly 300) is provided. The micromachined mirror assembly may include a micro mirror (e.g., micro mirror 302) and at least one piezoelectric actuator (e.g., piezoelectric actuator 304/305). The micro mirror may be suspended over a substrate (e.g., substrate 320) by at least one beam (e.g., beam 307/311) mechanically coupled to the micro mirror. The at least one piezoelectric actuator may be mechanically coupled to the at least one beam. In some embodiments, the micro mirror may be suspended over the substrate by two beams (e.g., beams 307 and 311) mechanically coupled to the micro mirror, with one of the beams mechanically coupled to one end of the micro mirror, and the other beam mechanically coupled to an opposite end of the micro mirror. In some embodiments, the at least one piezoelectric actuator may include two piezoelectric actuators (e.g., piezoelectric actuators 304 and 305), with one piezoelectric actuator mechanically coupled to one beam and the other piezoelectric actuator mechanically coupled to the other beam.

In step S604, the at least one piezoelectric actuator receives a first electrical signal (e.g., signal 510 shown in FIGS. 5A and 5B). In some embodiments, multiple piezoelectric actuators may be used. Each piezoelectric actuator may receive a respective electrical signal (e.g., piezoelectric actuator 304 receives signal 510 and piezoelectric actuator 305 receives signal 520 as shown in FIGS. 5A and 5B). The first and second electric signals may have the same frequency that is equal to a resonant frequency of the micro mirror. In some embodiments, the first and second electrical signals are different in at least one of amplitude or phase, as discussed above in connection with FIGS. 5A and 5B.

In step S606, the at least one piezoelectric actuator is used to drive the micro mirror to tilt along a first axis (e.g., axis 309) based on the first electrical signal. For example, electrical signal 510 shown in FIG. 5A may cause piezoelectric actuator 304 to expand and shrink in size. This motion can be transferred to anchor 308 and 310, causing the anchors to tilt, which in turn causes beams 307 and 311 to rotate (e.g., twist) along axis 309. The rotation of beams 307 and 311 drives micro mirror 302 to tilt along axis 309. In some embodiments, multiple sets of piezoelectric actuators may be used to tilt the micro mirror along multiple axes, as discussed above in connection with FIG. 4.

In step S610, a position sensor (e.g., position sensor 306) may detect a position of the micro mirror. The position sensor may include a stator (e.g., stator 322) attached to the at least one piezoelectric actuator (e.g., piezoelectric actuator 304/305). The position sensor may include a comb structure (e.g., comb structure 324) including a plurality of teeth interleaved with a corresponding plurality of teeth on the micro mirror, as discussed above in connection with FIGS. 3A and 3B.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A micromachined assembly for controlling optical directions in an optical sensing system, the micromachined mirror assembly comprising:
a micro mirror suspended over a substrate by at least one beam, the at least one beam directly coupled to the micro mirror at a first end of the at least one beam and directly coupled to at least one anchor at a second end of the at least one beam; and
at least one piezoelectric actuator mechanically coupled to the at least one beam through the at least one anchor and configured to drive the micro mirror via the at least one beam, the at least one piezoelectric actuator rigidly coupled to the at least one anchor,
wherein a first electrical signal received by the at least one piezoelectric actuator causes a displacement of the at least one anchor, which causes the at least one beam directly coupled to the at least one anchor to rotate which drives the micro mirror to tilt along a first axis.

2. The micromachined mirror assembly of claim 1, wherein:
the at least one beam comprises a first beam and a second beam, the first beam is directly coupled to one side of the micro mirror and the second beam is directly coupled to an opposite side of the micro mirror; and
the at least one piezoelectric actuator is mechanically coupled to the first and second beams.

3. The micromachined mirror assembly of claim 1, wherein:
the at least one piezoelectric actuator comprises first and second piezoelectric actuators;
the first piezoelectric actuator is configured to receive the first electrical signal; and
the second piezoelectric actuator is configured to receive a second electrical signal, wherein the first and second electrical signals have a same frequency.

4. The micromachined mirror assembly of claim 3, wherein:
the frequency of the first or second electrical signal is equal to a resonant frequency of the micro mirror.

5. The micromachined mirror assembly of claim 3, wherein:
the first and second electrical signals are different in at least one of amplitude or phase.

6. The micromachined mirror assembly of claim 1, wherein:
the at least one piezoelectric actuator and the at least one anchor are both disposed on the substrate.

7. The micromachined mirror assembly of claim 1, comprising:
a position sensor configured to detect a position of the micro mirror.

8. The micromachined mirror assembly of claim 7, wherein:
the position sensor comprises a comb structure, the comb structure comprising a plurality of teeth interleaved with a corresponding plurality of teeth on the micro mirror.

9. The micromachined mirror assembly of claim 7, wherein:
the position sensor comprises a stator attached to the at least one piezoelectric actuator.

10. The micromachined mirror assembly of claim 1, wherein:
the at least one piezoelectric actuator comprises a first set of piezoelectric actuators and a second set of piezoelectric actuators;
the first set of piezoelectric actuators are configured to drive the micro mirror to tilt along the first axis; and
the second set of piezoelectric actuators are configured to drive the micro mirror to tilt along a second axis.

11. The micromachined mirror assembly of claim 10, wherein:
the first axis is perpendicular to the second axis.

12. A method for controlling optical directions in an optical sensing system, the method comprising:
providing a micromachined mirror assembly, wherein the micromachined mirror assembly comprises:
a micro mirror suspended over a substrate by at least one beam, the at least one beam directly coupled to the micro mirror at a first end of the at least one beam and directly coupled to at least one anchor at a second end of the at least one beam;
at least one piezoelectric actuator mechanically coupled to the at least one beam through the at least one anchor and rigidly coupled to the at least one anchor;
receiving, by the at least one piezoelectric actuator, a first electrical signal; and
driving the micro mirror by receiving a first electrical signal at the at least one piezoelectric actuator that causes a displacement of the at least one anchor which causes the at least one beam coupled to the at least one anchor to rotate, which causes the micro mirror to tilt along a first axis.

13. The method of claim 12, wherein:
the at least one beam comprises a first beam and a second beam, the first beam is directly coupled to one side of the micro mirror and the second beam is directly coupled to an opposite side of the micro mirror;
the at least one piezoelectric actuator comprises a first piezoelectric actuator and a second piezoelectric actuator, each of the first and second piezoelectric actuators is mechanically coupled to the first and second beams, and
the method further comprises:
receiving, by the first piezoelectric actuator, the first electrical signal;
receiving, by the second piezoelectric actuator, a second electrical signal having a same frequency as the first electrical signal.

14. The method of claim 12, comprising:
detecting, by a position sensor, a position of the micro mirror, wherein the position sensor comprises a stator attached to the at least one piezoelectric actuator.

15. An optical sensing system comprising:
a transmitter configured to emit optical signals in a plurality of directions;
a receiver configured to detect reflected optical signals; and
a mirror assembly configured to control the directions of the optical signals, the mirror assembly comprising:
a micro a micro mirror suspended over a substrate by at least one beam, the at least one beam directly coupled to the micro mirror at a first end of the at least one beam and directly coupled to at least one anchor at a second end of the at least one beam; and at least one piezoelectric actuator mechanically coupled to the at least one beam through the at least one anchor and configured to drive the micro mirror via the at least one beam, the at least one piezoelectric actuator rigidly coupled to the at least one anchor, wherein a first electrical signal received by the at least one piezoelectric actuator causes a displacement of the at least one anchor, which causes the at least one beam directly coupled to the at least one anchor to rotate which drives the micro mirror to tilt along a first axis.

16. The optical sensing system of claim 15, wherein:

the at least one beam comprises a first beam and a second beam, the first beam is directly coupled to one side of the micro mirror and the second beam is directly coupled to an opposite side of the micro mirror; and the at least one piezoelectric actuator is mechanically coupled to the first and second beams.

17. The optical sensing system of claim 15, wherein:

the at least one piezoelectric actuator comprises a first set of piezoelectric actuators and a second set of piezoelectric actuators;

the first set of piezoelectric actuators are configured to drive the micro mirror to tilt along the first axis; and the second set of piezoelectric actuators are configured to drive the micro mirror to tilt along a second axis.

* * * * *